Patented Oct. 26, 1926.

1,604,124

UNITED STATES PATENT OFFICE.

HERBERT A. KERN, OF CHICAGO, ILLINOIS.

WATER SOFTENER.

No Drawing. Application filed April 24, 1924. Serial No. 708,780.

This invention relates to methods and materials for use in the treatment of water supplies and more particularly to the softening of hard water.

I have found, for example, that sodium aluminate when properly used is very satisfactory for treatment and softening of water. Commercial sodium aluminate, as now marketed, is a solution containing approximately 18% of sodium aluminate, 9% of sodium carbonate, 6% of sodium hydroxide, 5% of other material, mainly organic, and approximately 62% of water. Heretofore this material, which is commercially available in large quantities as a by-product of certain aluminum manufactures, has been used only in comparatively small quantities merely as a mordant.

Although sodium aluminate has characteristics which make it extremely valuable for water treatment, its use has been heretofore greatly limited by the unsatisfactory nature of the product commercially available. This solution has the unfortunate characteristic that crystals of sodium aluminate become separated out in substantial quantities upon standing, as a result of temperature changes, as well as from other less obvious causes. In many cases, at least 50% of the product has shown some degree of solidification and in some of the shipments more than 50% of the contents has been in solid form. The product may be made wholly liquid by heating, either by the introduction of live steam or by other suitable means, which must necessarily be applied before the product may be successfully utilized.

Since in using such products it is necessary to mix small amounts with very large amounts of water, it will be apparent that this can be done much more conveniently if the products are in liquid form. The occurrence of crystallization in such products is often even more serious than would be expected since when the products become partially solid, it is extremely difficult, and under such circumstances impossible, to again bring them completely into solution. The necessity of heating such products as sodium aluminate and maintaining the products hot during their use as water softeners would, of course, very greatly limit their sale for the treatment of water. I have found, however, that with certain solutions used in water treatment that crystallization may be readily prevented by adding to the solutions a quantity of chemical of such character that the water softener is thereby substantially permanently retained in solution without the application of heat.

Accordingly, the objects of my invention include the provision of an improved product for the treatment of water, which product I have found may embody, for example, the use of sodium aluminate.

A further object of my invention comprises the provision of a water softening product, consisting of a solution of a plurality of chemical compounds, one of which is an effective water softener of such character that substantial quantities become solidified in independent cold solution thereof, but another of the compounds being of the character and being present in quantities such that the first compound is retained substantially permanently in solution therewith even when cold.

A further aim of my invention is to provide a water softener comprising sodium aluminate that is liquid under its normal conditions of use.

Further objects will be apparent from the following disclosure and claims relating to my invention.

In practicing my invention, I prepare for example a product comprising sodium aluminate which has all the virtues of the ordinary commercial sodium aluminate and yet remains substantially permanently liquid under its normal conditions of use. I have found that it is possible to prepare such a solution by adding to the ordinary commercial aluminate, as above described, a sufficient quantity of an appropriate soluble material such for example, as sodium or potassium hydroxide. Sodium hydroxide amounting to about 10% of the weight of the commercial aluminate solution is satisfactory. Accordingly, it is apparent that with the approximate quantity of 6% of sodium hydroxide or caustic soda present in the commercial aluminate, an additional amount sufficient to make the total content in the neighborhood of 16% is advisable. After the 10% of caustic soda has been added, the sodium aluminate will then amount to approximately 16% of the total solution. Hence, it appears that substantially equal quantities of the aluminate and caustic soda will provide a solution from which the aluminate will not crystallize out. With sodium aluminate, as sometimes commercially available, I have found that as little as 8% of caustic soda is sufficient to prevent separation of the aluminate. However, to insure dependable results with various shipments of the commercial sodium aluminate, it is my practice to add more than 8% of the caustic soda. In this manner, I completely prevent solidification of any portion of the product under the normal conditions of sale, storage and use now prevailing. Accordingly, a thoroughly satisfactory product suitable for use in water treatment is thus made available.

Caustic soda itself has long been known as a useful compound for the treatment of water, since it softens both "temporarily" and "permanently" hard water and thus it adds to rather than detracts from the efficiency of the sodium aluminate, or other product to which it may be added, since it not only holds it permanently in solution but accelerates the action between the sodium aluminate and the salts present in the hard water. This characteristic is especially valuable when it is desired to perform the water softening operation by treatment of the water within a steam boiler.

While I have described above in detail one embodiment of my invention, it will be understood that various changes and substitutions of equivalents may be made without departing from the scope and principles of my invention as set forth in the appended claims. While I prefer to treat commercial sodium aluminate solutions, for example, with additional quantities of sodium hydroxide, other materials such as potassium hydroxide as above noted are available for this purpose.

Futhermore, while I have above described as an example the treatment of a water softening product comprising commercial sodium aluminate, it will be understood that the scope of my invention may include the treatment of other water softening solutions. Thus I have treated water softening solutions containing approximately 72% of sodium silicate, and 9% sodium hydroxide with approximately 3% of the tri-sodium phosphate. Without the tri-sodium phosphate such a solution is a desirable water softener under certain conditions but it suffers the disadvantage that solidification often occurs unless it is maintained in a warm condition. However, with the addition of the small percentage of tri-sodium phosphate such solidification is prevented.

Having thus described by invention, what I claim as new and desire to secure by Letters Patent of the United States, is:

1. A substantially permanently liquid product for water treatment comprising sodium aluminate and caustic soda.

2. A product for water treatment comprising sodium aluminate and caustic soda in solution therewith in sufficient quantity to retain substantially all of the sodium aluminate in solution while cold.

3. A product for water treatment comprising sodium aluminate in solution with a quantity of caustic soda amounting at least in the neighborhood of 14% of the solution.

4. A product for water treatment comprising a solution of approximately equal quantities of sodium aluminate and caustic soda.

5. A solution for water treatment containing in the neighborhood of 16% of sodium aluminate and approximately an equal percentage of caustic soda.

6. A solution for water treatment containing in the neighborhood of 16% of sodium aluminate and approximately an equal percentage of other material that is a water softener and which serves to retain the sodium aluminate in substantially permanently liquid solution while cold.

7. A water softening product comprising a substantially permanently stable cold liquid solution containing substantially 16% of dissolved sodium aluminate and caustic soda in excess of 8 per cent.

8. A water softening material comprising a commercial by-product of aluminum manufacture containing sodium aluminate and sodium hydroxide.

9. A water softening material comprising a commercial by-product of aluminum manufacture containing sodium aluminate and sodium hydroxide to which has been added an additional quantity of sodium hydroxide sufficient to render the material substantially permanently liquid when cold.

In witness whereof, I have hereunto subscribed my name.

HERBERT A. KERN.